US008484628B2

(12) United States Patent
Behrens et al.

(10) Patent No.: US 8,484,628 B2
(45) Date of Patent: Jul. 9, 2013

(54) SYSTEM AND METHOD FOR PROVIDING GLOBAL VARIABLES WITHIN A HUMAN CAPITAL MANAGEMENT SYSTEM

(75) Inventors: Christian Behrens, Wiesloch (DE); Steffen Rotsch, Rauenberg (DE); Martin Scholz, Nußloch (DE)

(73) Assignee: SAP AG, Walldorf (DE)

( * ) Notice: Subject to any disclaimer, the term of this patent is extended or adjusted under 35 U.S.C. 154(b) by 1164 days.

(21) Appl. No.: 11/829,146

(22) Filed: Jul. 27, 2007

(65) Prior Publication Data
US 2009/0031112 A1    Jan. 29, 2009

(51) Int. Cl.
*G06F 9/44*    (2006.01)
(52) U.S. Cl.
USPC .......................................................... 717/140
(58) Field of Classification Search
USPC .......................................................... 717/140
See application file for complete search history.

(56) References Cited

U.S. PATENT DOCUMENTS

| 5,530,870 | A * | 6/1996 | De Bruler ..................... 717/155 |
| 5,682,526 | A * | 10/1997 | Smokoff et al. ..................... 1/1 |
| 6,550,058 | B1 * | 4/2003 | Wynn ............................. 717/158 |
| 7,730,493 | B2 * | 6/2010 | Elms et al. ..................... 719/316 |
| 2006/0064673 | A1 * | 3/2006 | Rogers et al. ................. 717/113 |
| 2006/0265448 | A1 * | 11/2006 | Qing et al. .................... 709/203 |

* cited by examiner

*Primary Examiner* — Li B Zhen
*Assistant Examiner* — Duy Khuong Nguyen
(74) *Attorney, Agent, or Firm* — Kenyon & Kenyon LLP

(57) ABSTRACT

A system and method are provided for stacking global variables associated with a plurality of tools. The method includes loading a first tool global variable into a memory and executing a first tool of a computer application, the computer application configured to automate human resource processes. The method includes responsive to a call to execute a second tool of the computer application, pushing the first tool global variable onto a stack. The method includes loading a second tool global variable into the memory and executing the second tool. The method includes responsive to completing execution of the second tool, popping the first tool global variable off the stack and loading the first tool global variable back into the memory.

20 Claims, 4 Drawing Sheets

SYSTEM AND METHOD FOR PROVIDING GLOBAL VARIABLES WITHIN A HUMAN CAPITAL MANAGEMENT SYSTEM

BACKGROUND

A human capital management (HCM) system may automate various human resource processes. For example, a HCM system may automate the functionality of hiring a new employee, terminating an existing employee, reassigning an employee, granting extended leave, etc. Each functionality may require one or more approvals before the request is granted, and the HCM system automates the process of generating the appropriate requests and collecting completed approvals before granting the request if the process was successfully completed. In addition, a HCM system may provide various workforce analytics, which quantifies various aspects of human resources management within the HCM system. To setup such a process, various customizing tables are required to be maintained by customers. Within the HCM system, various tools functionality for maintaining these customizing tables are implemented to provide functionality.

Each tool in the HCM system may be associated with global variables necessary for correct operation of the tool. If a first tool calls a second tool, the global variables associated with the first tool may be overwritten by the global variables associated with the second tool. This may cause runtime errors when the second tool finishes executing and control returns to the first tool.

A stack is a data structure based on the principle of Last In First Out (LIFO). Data may be "pushed" onto a stack and added to the data structure. When data is to be retrieved from the stack, it is "popped" from the stack and removed from the data structure. The retrieve data would be data most recently stored into the stack via a "push" operation.

Thus, a need exists to provide stacking of global variables within multiple screens of a HCM system.

DETAILED DESCRIPTION

A method and system are provided for stacking and unstacking global variables when navigating between screens within an HCM system. The HCM system includes at least one global variable used by a plurality of screens, each of which may access the global variable.

Figure 1:
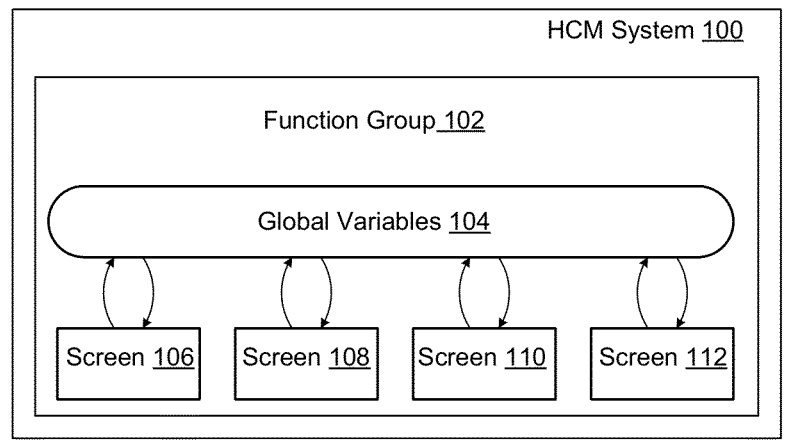
FIG. 1 depicts an example function group with associated global variables and screens in accordance with an embodiment of the present invention.

FIG. 1 depicts an example function group with associated global variables and screens in accordance with an embodiment of the present invention. The function diagram 100 depicts an example relationship between global variables and tools and each tool's associated screen.

A function group 102 may exist within a HCM system and include a set of tools and a set of global variables associated with the tools. The function group 102 may represent a set of related functionalities within the HCM system and define behavior of a process or form scenario.

The global variables 104 may be a set of global variables used by tools with the HCM system. The global variables 104 may share the same names and memory addresses due to limitations within the programming environment. Alternatively, the global variables 104 may share names and memory addresses for performance and efficiency.

Each tool within the HCM system may be associated with a screen, such as screens 106, 108, 110 and 112. Each tool may be configured to provide a form to the user and be associated with user input fields and displayed information. The user interface of each tool may be displayed on its associated screen.

Example global variables include:

A tool class. Each tool may include a reference to a tool class that the tool is associated with. Because each screen is different, a different tool class is required to provide the different screen behaviors. This global variable may include a pointer to the tool class, or a pointer to a tool class definition.

B. Cursor position. If a user double clicks in an area and a new screen appears, for example, as a popup, the existing cursor position is stored in this variable. After the user exits the popup screen, the cursor position is reloaded from this variable. This global variable may store the cursor position of the user's mouse pointer when the user navigates to another tool.

C. Screen data. Limitations within the programming environment may require all screen data to be stored as global variables. If two screens share the same global variable names, calling a second screen from within the first screen would overwrite the first screen's variables with the second screen's variables. For example, this variable may include displayed text or display properties.

It will be appreciated that while only four screens are depicted, any number of tools and their associated screens may be included in a HCM system. In an alternative embodiment, a tool may include sub-tools. For example, a sub-tool may be a tool called from within another too.

Figure 2:
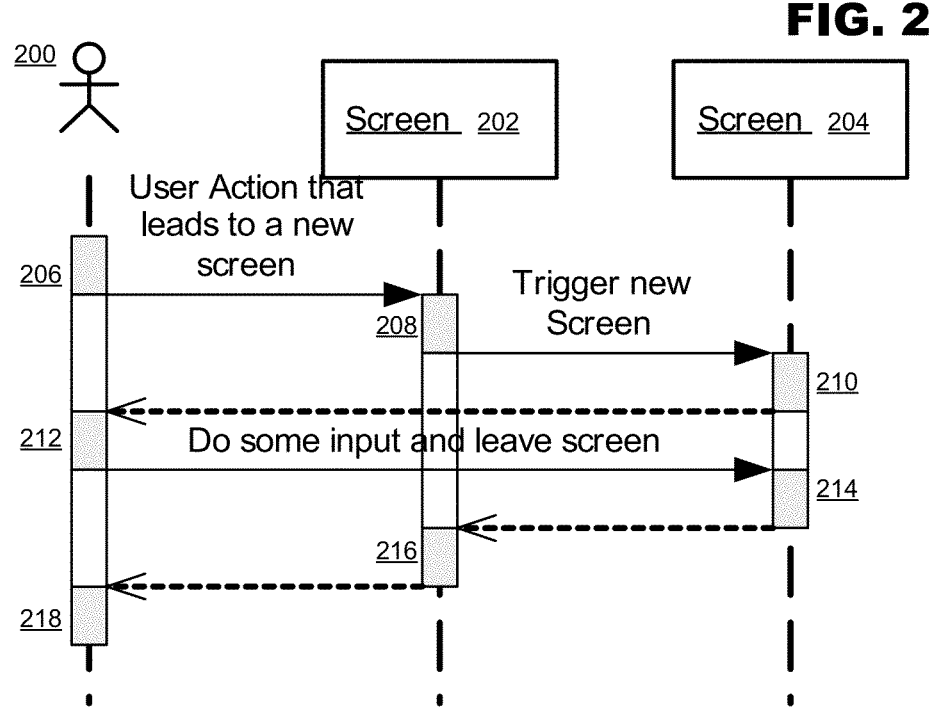
FIG. 2 depicts an example interaction between a first tool and a second tool in accordance with an embodiment of the present invention.

FIG. 2 depicts an example interaction between a first tool and a second tool in accordance with an embodiment of the present invention. In one embodiment, the HCM system does not implement a stack to store the global variables of multiple tools.

A user 200 may interact with a HCM system through screens 202 and 204. Screens 202 and 204 may be associated with individual tools that provide functionality and behavior. For example, the HCM system may execute in a system as depicted later and discussed elsewhere. The screens 202 and 204 may be in a function group as depicted above.

In 206, the user 200 provides user input that activates screen 202.

In 208, screen 202 activates screen 204. For example, screen 204 may be activated through additional user input or through system activation, for example, by a request from screen 202.

In 210, screen 204 executes and provides its functionality associated with its tool. Screen 204 may request additional input from the user 200. For example, screen 204 may overwrite global variables associated with the screen 202, as discussed above.

In 212, the user 200 may provide the input requested by screen 204. Control then returns to screen 204.

In 214, the screen 204 may terminate execution and return control to screen 202. Similar to 210, screen 204 may overwrite global variables associated with screen 202, as discussed above.

In 216, control returns to screen 202. The screen 202 may finish providing its functionality, but an error may occur because its global variables may have been overwritten by screen 204 in 210 and 214. When the screen 202 finishes execution, control returns to the user in 218.

Figure 3:
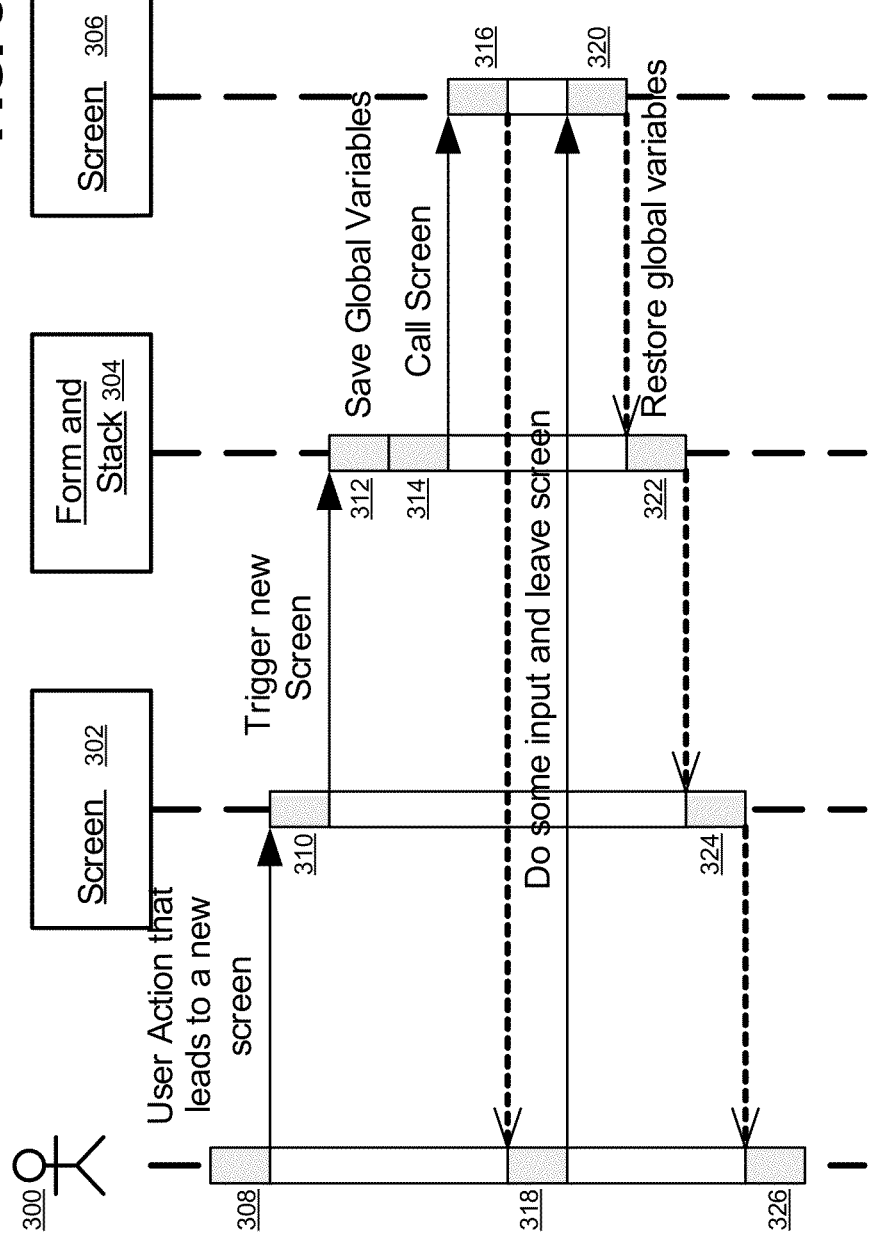
FIG. 3 depicts an example interaction between a first tool, a stack, and a second tool in accordance with an embodiment of the present invention.

FIG. 3 depicts an example interaction between a first tool, a stack, and a second tool in accordance with an embodiment of the present invention. In one embodiment, the HCM system includes a stack where global variables of a tool is stored while another tool is executing, thereby preventing overwriting of global variables.

A user 300 may interact with a HCM system through screens 302 and 306. Screens 302 and 306 may be associated with individual tools that provide functionality and behavior. For example, the HCM system may execute in a system as depicted later and discussed elsewhere. The screens 302 and 306 may be in a function group as depicted above. The HCM system may also include a stack 304 configured to temporarily store global variables associated with screen 302 and 304. For example, the stack 304 may be as discussed above.

In 308, the user 300 provides user input that activates screen 302.

In 310, screen 302 activates screen 306. For example, screen 306 may be activated through additional user input or through system activation, for example, by a request from screen 302.

In 312, the stack 304 may intercept the request to execute screen 306. The stack 304 store the global variables associated with screen 302. The global variables may be pushed onto the stack 304.

In 314, the stack 304 may then execute screen 306 as requested.

In 316, screen 306 executes and provides its functionality associated with its tool. Screen 306 may request additional input from the user 300. In this example embodiment, screen 306 may overwrite global variables associated with the screen 202 but the global variables are stored in stack 304.

In 318, the user 300 may provide the input requested by screen 306. Control then returns to screen 306.

In 320, the screen 306 may terminate execution and return control to screen 302. Similar to 316, global variables associated with screen 302 are protected by being stored in stack 304.

In 322, the global variables stored in 312 are restored. The global variables are popped off the stack 304.

In 324, control returns to screen 302. The screen 302 may finish providing its functionality. The global variables associated with the screen 302 are preserved by storage in stack 304. When the screen 302 finishes execution, control returns to the user in 326.

In one example embodiment, the stack 304 may be implemented with an existing runtime stack. For example, screen 306 may be called with a screen call routine, and therefore becomes a subroutine. Programming languages provide a runtime stack for the calling and execution of subroutines, as is known. When a subroutine is called, the calling routine's state (including variables and other information) are pushed onto the runtime stack. Control is then given to the subroutine. If a sub-subroutine is called, the subroutine's state is also pushed onto the runtime stack and control is given to the sub-sub routine. This can occur until no more subroutines are called.

Upon termination, the calling routine's state is popped off the runtime stack and restored. This can occur until there are no more calling routines.

In another example embodiment, the stack 304 may be programmed and implemented in the HCM system as a module or add-on.

In another example embodiment, tools within the HCM system may register their variables which are not used on the screen, but rather only for control purposes. This special register tracks the registered data which is preserved when a new screen is called, and restored when the new screen terminates.

It will be appreciated that while only two screens are depicted, any number of screens may be called from with other screens. Global variables associated with each screen are pushed onto the stack when control transfers to another screen, and popped off the stack when control returns.

Figure 4:
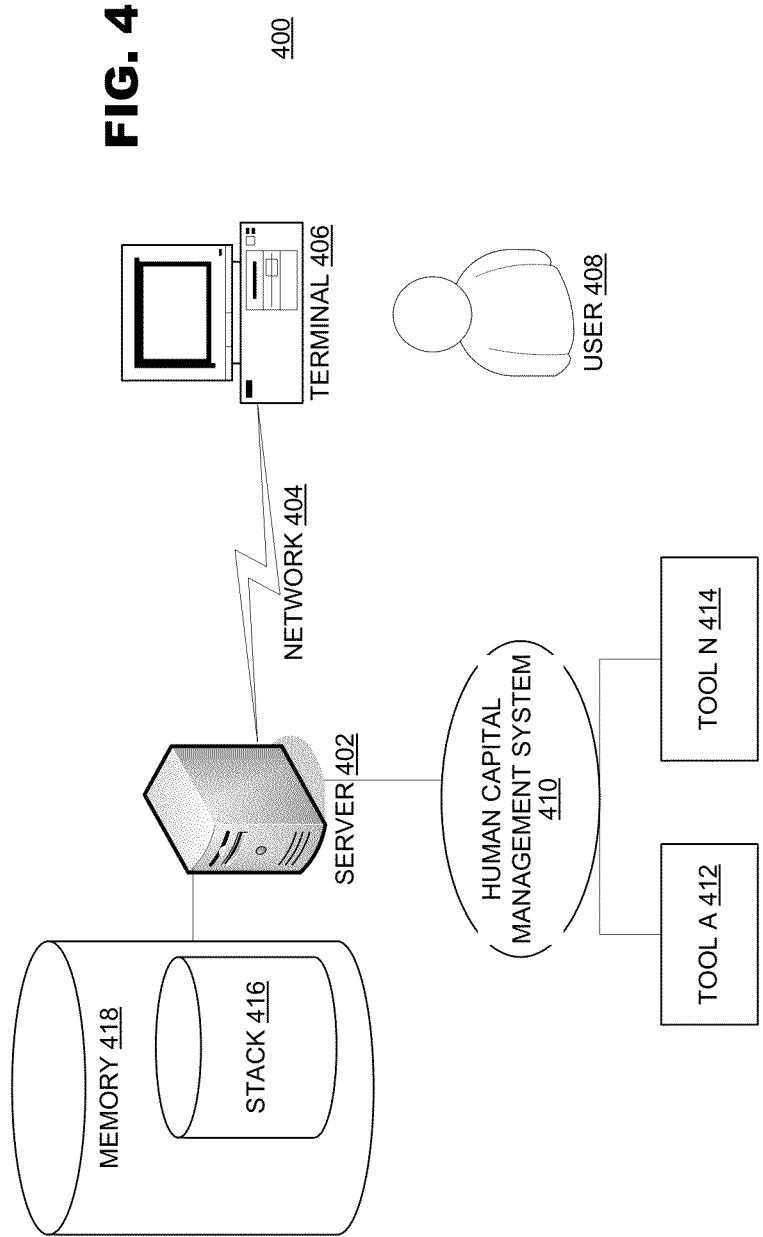
FIG. 4 depicts an example system for a first tool and a second tool in a human capital management system in accordance with an embodiment of the present invention.

FIG. 4 depicts an example system for a first tool and a second tool in a human capital management system in accordance with an embodiment of the present invention. A system 400 may be configured to execute a computer application such as HCM system, for example, in an enterprise environment. The HCM system may automate human resources functions within the enterprise as discussed above.

The system 400 may include a server 402. The server 402 may include a processor configured to execute computer instructions stored in a memory, for example, the HCM system. The server 402 may include a variety of security and backup measures to ensure continual operation and data security. While only one server is depicted, it will be appreciated that a distributed system of servers may be used.

The server 402 may be in communication with a terminal 406 over a network 404. The network 404 may be configured to communicate information between the server 402 and the terminal 406, and be the Internet, a local network, a Wide Area Network, a wireless network or other network or communication scheme.

The terminal 406 may interact with a user 408. For example, the terminal 406 may be a personal computer, a mobile device, a wireless device, or any other device configured to interact with the user 408 and communicate with the server 402 over the network 404.

The user 408 may be an authorized user of the system with permission to utilize the HCM system. For example, the user 408 may be a human resources administrator within an enterprise authorized to use the HCM system.

The server 402 may execute a HCM system 410. The HCM system 410 may be a computer application as discussed above.

The HCM system 410 may include tools 412 and 414. The tools 412 and 414 may be associated with screens as discussed above.

Figure 5:
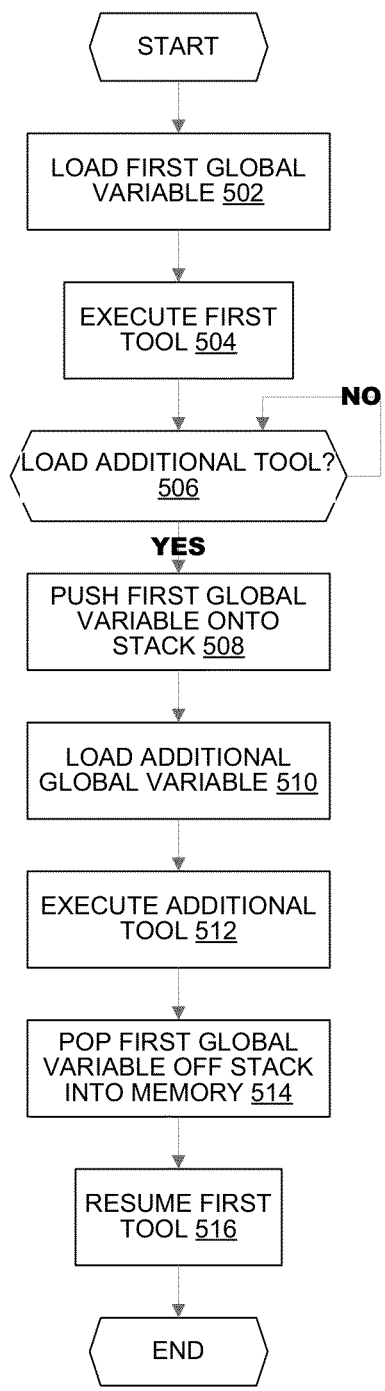
FIG. 5 depicts an example procedure for executing a first tool and a second tool in a human capital management system in accordance with an embodiment of the present invention.

The server 402 may be in communication with a memory 418, including a stack 416. For example, the memory 418 may be random access memory (RAM). The stack 416 may be configured to store global variables associated with tools 412 and 414, as discussed above FIG. 5 depicts an example procedure for executing a first tool and a second tool in a human capital management system in accordance with an embodiment of the present invention. The procedure may execute on a system including a server and a terminal as discussed above. The procedure may be provide a user interface to a user via tools of the HCM systems as discussed above.

In 502, the server may load a first global variable. The first global variable may be associated with a first tool. For example, the first global variable may be a global variable discussed above. The first global variable may be loaded into memory accessible to the HCM system.

In 504, the server may load and execute the first tool. The first tool may be a tool as discussed above. During execution, the first tool may interact with the user.

In 506, the server may test whether an additional tool is to be loaded. If yes, the procedure may proceed to 508. For example, the additional tool may be called from within the first tool, or called by the system.

In 508, the server may push a first global variable onto a stack. The stack may be as discussed above and include operations such as "push" and "pop".

In 510, the server may load an additional global variable. The additional global variable may be associated with an additional tool. The additional global variable may be loaded into memory accessible to the HCM system.

In 512, the server may load and execute the additional tool. The additional tool may be a tool as discussed above. During execution, the additional tool may interact with the user.

In 514, the server may pop the first global variable off the stack back into memory.

In 516, the server may resume the first tool. Control may return to the first tool after the additional tool terminates.

It will be appreciated that a plurality of first global variables may be associated with the first tool and a plurality of second global variables may be associated with the second tool.

It will be appreciated that any number of additional tools may be loaded in 512. Global variables are simply pushed onto the stack until the tool associated with the global variables resumes control.

One embodiment of the present invention may be a method for stacking global variables associated with a plurality of tools. The method may include loading a first tool global variable into a memory and executing a first tool of a computer application, the computer application configured to automate human resource processes. The method may include responsive to a call to execute a second tool of the computer application, pushing the first tool global variable onto a stack. The method may include loading a second tool global variable into the memory and executing the second tool. The method may include responsive to completing execution of the second tool, popping the first tool global variable off the stack and loading the first tool global variable back into the memory. The computer application may execute on a server and communicate with at least one terminal over a network. The computer application may be a human capital management application and the first tool may provide a form within the human resource management computer application. The call to execute the second tool may be encapsulated as a subroutine call. The subroutine call may be implemented on a runtime environment's call stack. The method may include pushing the second tool global variable onto the stack. The method may include loading a third tool global variable into the memory and executing a third tool of the computer application. The method may include popping the second tool global variable off the stack and loading the second tool global variable back into memory. The first global variable may be associated with the first tool and the second global variable may be associated with the second tool.

Another embodiment of the present invention may be a system for stacking global variables associated with a plurality of tools. The system may include a memory configured to store a stack, the stack configured to store a plurality of variables, a first tool global variable, a second tool global variable. The memory may store a first tool of a computer application, the computer application configured to automate human resource processes, and a second tool of the computer application. The system may include a processor in communication with the memory. The processor may be configured to load the first tool global variable into the memory and executing the first tool. The processor may be configured to responsive to a call to execute the second tool, pushing the first tool global variable onto the stack. The processor may be configured to load the second tool global variable into the memory and execute the second tool. The processor may be configured to, responsive to completing execution of the second tool, pop the first tool global variable off the stack and load the first tool global variable back into the memory. The processor may be configured to a terminal, wherein the processor is located in a server and the server communicates with at the terminal over a network. The computer application may be a human capital management application and the first tool may provide a form within the human resource management computer application. The call to execute the second tool may be encapsulated as a subroutine call. The subroutine call may be implemented on a runtime environment's call stack. The processor may be configured to push the second tool global variable onto the stack. The processor may be configured to load a third tool global variable into the memory and execute a third tool of the computer application. The processor may be configured to pop the second tool global variable off the stack and load the second tool global variable back into memory. The first global variable may be associated with the first tool and the second global variable may be associated with the second tool.

Another embodiment of the present invention may be a computer-readable medium including instructions adapted to execute a method for stacking global variables associated with a plurality of tools. The method may include loading a first tool global variable into a memory and executing a first tool of a computer application, the computer application configured to automate human resource processes. The method may include responsive to a call to execute a second tool of the computer application, pushing the first tool global variable onto a stack. The method may include loading a second tool global variable into the memory and executing the second tool. The method may include responsive to completing execution of the second tool, popping the first tool global variable off the stack and loading the first tool global variable back into the memory. The computer application may execute on a server and communicate with at least one terminal over a network. The computer application may be a human capital management application and the first tool may provide a form within the human resource management computer application. The call to execute the second tool may be encapsulated as a subroutine call. The subroutine call may be implemented on a runtime environment's call stack. The method may include pushing the second tool global variable onto the stack. The method may include loading a third tool global variable into the memory and executing a third tool of the computer application. The method may include popping the second tool global variable off the stack and loading the second tool global variable back into memory. The first global variable may be associated with the first tool and the second global variable may be associated with the second tool.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

What is claimed is:

1. A method for stacking global variables associated with a plurality of tools, comprising:
providing a plurality of global variables shared by the plurality of tools for a computer application, wherein each of the plurality of global variables are accessible from each of the plurality of tools and has a same respective name when accessed from each of the plurality of tools;
loading a first global variable into a memory and executing a first tool of the computer application, the computer application configured to automate human resource processes, wherein the first global variable is a reference to a tool class definition the first tool is associated with;
responsive to a call to execute a second tool of the computer application, pushing the first global variable and screen data associated with the first tool onto a stack;
loading a second global variable into the memory and executing the second tool, wherein the second global variable is a current cursor position before executing the second tool, wherein each of the first and second tool is configured to provide a respective form on a respective display screen; and
responsive to completing execution of the second tool, popping the first global variable and the screen data associated with the first tool off the stack, and loading the first global variable and the screen data associated with the first tool back into the memory.

2. The method of claim 1, wherein the computer application executes on a server and communicates with at least one terminal over a network.

3. The method of claim 2, wherein the computer application is a human capital management application and the first tool provides user interface within the human resource management computer application.

4. The method of claim 1, wherein the call to execute the second tool is encapsulated as a subroutine call.

5. The method of claim 4, wherein the subroutine call is implemented on a runtime environment's call stack.

6. The method of claim 1, further comprising:
pushing the second global variable onto the stack;
loading a third global variable into the memory and executing a third tool of the computer application; and
popping the second global variable off the stack and loading the second global variable back into memory.

7. The method of claim 1, wherein the first global variable is associated with the first tool and the second global variable is associated with the second tool.

8. A system for stacking global variables associated with a plurality of tools, comprising:
a memory configured to store,
a stack, the stack configured to store a plurality of global variables, wherein each of the plurality of global variables are accessible from each of the plurality of tools and has a same respective name when accessed from each of the plurality of tools, the plurality of global variables include a first global variable and a second global variable,
a first tool of a computer application, the computer application configured to automate human resource processes, and
a second tool of the computer application; and
a processor in communication with the memory, the processor configured to,
load the first global variable into the memory and executing the first tool,
wherein the first global variable is a reference to a tool class definition the first tool is associated with,
responsive to a call to execute the second tool, pushing the first global variable and screen data associated with the first tool onto the stack,
load the second global variable into the memory and execute the second
tool, wherein the second global variable is a current cursor position before executing the second tool, wherein each of the first and second tool is configured to provide a respective form on a respective display screen, and
responsive to completing execution of the second tool, pop the first global variable and the screen data associated with the first tool off the stack, and load the first global variable and the screen data associated with the first tool back into the memory.

9. The system of claim 8, further comprising:
a terminal, wherein the processor is located in a server and the server communicates with at the terminal over a network.

10. The system of claim 9, wherein the computer application is a human capital management application and the first tool provides user interface within the human resource management computer application.

11. The system of claim 8, wherein the call to execute the second tool is encapsulated as a subroutine call.

12. The system of claim 11, wherein the subroutine call is implemented on a runtime environment's call stack.

13. The system of claim 8, the processor further configured to,
push the second global variable onto the stack,
load a third global variable into the memory and execute a third tool of the computer application, and
pop the second global variable off the stack and load the second global variable back into memory.

14. The system of claim 8, wherein the first global variable is associated with the first tool and the second global variable is associated with the second tool.

15. A non-transitory computer-readable medium including instructions adapted to execute a method for stacking global variables associated with a plurality of tools, the method including,
providing a plurality of global variables shared by the plurality of tools for a computer application, wherein each of the plurality of global variables are accessible from each of the plurality of tools and has a same respective name when accessed from each of the plurality of tools;
loading a first global variable into a memory and executing a first tool of a computer application, the computer application configured to automate human resource processes, wherein the first global variable is a reference to a tool class definition the first tool is associated with;
responsive to a call to execute a second tool of the computer application, pushing the first global variable and screen data associated with the first tool onto a stack;
loading a second global variable into the memory and executing the second tool, wherein the second global variable is a current cursor position before executing the second tool, wherein each of the first and second tool is configured to provide a respective form on a respective display screen; and responsive to completing execution of the second tool, popping the first global variable and the screen data associated with the first tool off the stack and loading the first global variable and the screen data associated with the first tool back into the memory.

16. The medium of claim 15, wherein the computer application executes on a server and communicates with at least one terminal over a network.

17. The medium of claim 16, wherein the computer application is a human capital management application and the first tool provides user interface within the human resource management computer application.

18. The medium of claim 15, wherein the call to execute the second tool is encapsulated as a subroutine call.

19. The medium of claim 18, wherein the subroutine call is implemented on a runtime environment's call stack and the first global variable is associated with the first tool and the second global variable is associated with the second tool.

20. The medium of claim 15, the method further including, pushing the second global variable onto the stack;
loading a third global variable into the memory and executing a third tool of the computer application; and
popping the second global variable off the stack and loading the second global variable back into memory.

* * * * *